(12) United States Patent
Hua et al.

(10) Patent No.: US 11,759,739 B2
(45) Date of Patent: Sep. 19, 2023

(54) SMOKE AND DUST TREATMENT APPARATUS FOR WELDING

(71) Applicant: NANTONG UNIVERSITY, Nantong (CN)

(72) Inventors: Liang Hua, Nantong (CN); Jiahao Zhao, Nantong (CN); Junguo Zhu, Nantong (CN); Binhui Pei, Nantong (CN); Chang Yuan, Nantong (CN); Liangliang Shang, Nantong (CN); Laiwu Luo, Nantong (CN); Yu Tang, Nantong (CN); Yuze Cheng, Nantong (CN); Delin Hu, Nantong (CN); Benteng Guo, Nantong (CN); Jin Gu, Nantong (CN)

(73) Assignee: NANTONG UNIVERSITY, Nantong (CN)

( * ) Notice: Subject to any disclaimer, the term of this patent is extended or adjusted under 35 U.S.C. 154(b) by 154 days.

(21) Appl. No.: 16/980,407

(22) PCT Filed: Jun. 14, 2019

(86) PCT No.: PCT/CN2019/091330
§ 371 (c)(1),
(2) Date: Sep. 13, 2020

(87) PCT Pub. No.: WO2020/087939
PCT Pub. Date: May 7, 2020

(65) Prior Publication Data
US 2022/0410054 A1    Dec. 29, 2022

(51) Int. Cl.
*B01D 46/00* (2022.01)
*B01D 39/10* (2006.01)
(Continued)

(52) U.S. Cl.
CPC ........ *B01D 46/0034* (2013.01); *B01D 39/10* (2013.01); *B01D 39/2055* (2013.01);
(Continued)

(58) Field of Classification Search
CPC  B01D 39/10; B01D 39/2055; B01D 39/1692; B01D 46/0034; B01D 46/0049;
(Continued)

(56) References Cited

U.S. PATENT DOCUMENTS 9,468,958 B2 * 10/2016 Hammers ............. B08B 15/002

FOREIGN PATENT DOCUMENTS

CN    203170138 U  *  9/2013

* cited by examiner

*Primary Examiner* — Allen R. B. Schult
(74) *Attorney, Agent, or Firm* — CBM PATENT CONSULTING, LLC

(57) ABSTRACT

A smoke and dust treatment apparatus for welding, said apparatus comprising a polishing and dust extraction module and a smoke and dust purification module. The polishing and dust extraction module comprises a double-layer dust extraction cover (3), a protective cover (2), an industrial brush (4), a first air guide portion, a second air guide portion (24) and a drive motor (22), the drive motor (22) driving the industrial brush (4) to rotate at high speed to perform polishing. During welding and polishing, a mechanical arm (6) drives the double-layer dust extraction cover (3), and a suction hole (20) of the double-layer dust extraction cover (3) and a suction guide hole (19) on the industrial brush (4) simultaneously take in toxic gas and debris such as iron filings.

6 Claims, 3 Drawing Sheets

(51) Int. Cl.
*B01D 39/20* (2006.01)
*B01D 46/10* (2006.01)
*B01D 46/54* (2006.01)
*B08B 1/00* (2006.01)
*B08B 1/04* (2006.01)
*B08B 5/04* (2006.01)
*B23K 37/00* (2006.01)
*B24D 13/10* (2006.01)
*B08B 15/04* (2006.01)

(52) U.S. Cl.
CPC ......... *B01D 46/0049* (2013.01); *B01D 46/10* (2013.01); *B01D 46/543* (2013.01); *B08B 1/002* (2013.01); *B08B 1/04* (2013.01); *B08B 5/04* (2013.01); *B08B 15/04* (2013.01); *B23K 37/00* (2013.01); *B24D 13/10* (2013.01); *B01D 2273/30* (2013.01)

(58) Field of Classification Search
CPC .. B01D 46/10; B01D 46/543; B01D 46/0041; B01D 46/12; B01D 2239/065; B08B 1/002; B08B 1/04; B08B 5/04; B08B 15/04; B23K 9/325; B23K 37/00
USPC .......................................................... 454/65
See application file for complete search history.

SMOKE AND DUST TREATMENT APPARATUS FOR WELDING

TECHNICAL FIELD

The invention relates to the technical field of industrial brushes, in particular to a smoke and dust treatment apparatus for welding.

DESCRIPTION OF RELATED ART

Welding is an important basic manufacturing technology, is an indispensable industrial technology means of mechanical processing industry. Grinding weld can effectively eliminate the influence of HAZ, strengthen the weld strength and improve the quality of weld. Electric industrial brush is the main grinding method. In the traditional grinding process, operators use hand-held grinding machine for grinding, and the rust left by grinding is often ignored. On the one hand, it causes waste of iron resources, on the other hand, it endangers human health. If the human body absorbs too much rust, it will cause dizziness and nausea, and excessive intake will be harmful to the liver. In the welding process, a lot of toxic smoke and gas will be produced, such as carbon oxide, ozone, nitrogen oxide, phosgene, iron oxide, alumina, manganese oxide, fluoride, etc. These toxic, harmful and carcinogenic substances are quite harmful to human body. Although the purchase and use of independent smoke purifier and electric industrial brush can purify welding fume, protect staff and polish welding seam, the operation is not flexible at the same time, which requires staff to operate separately, occupying a lot of valuable resources. In the actual industrial production process, due to the limitations of the enterprise scale, operating environment, operator composition and other conditions, the existing smoke purifier on the market has not been effectively promoted and used. Therefore, it is urgent to use convenient, efficient and economic equipment to make up for the shortcomings of the existing equipment and meet the needs of the larger group.

Technical Issues

The purpose of the invention is to provide a smoke and dust treatment apparatus for welding, which can realize timely treatment of smoke and dust and better treatment effect, at the same time, it can realize the integration and miniaturization of all treatment processes in welding process, which is conducive to industrial promotion.

Technical Solution

A smoke and dust treatment apparatus for welding comprises a polishing and dust extraction module and a smoke and dust purification module, wherein the smoke and dust purification module is disposed on one side of the polishing and dust extraction module and is communicated with the polishing and dust extraction module through an air guide hose.

The polishing and dust extraction module comprises a double-layer dust extraction cover, a protective cover, an industrial brush, first air guide portions, a second air guide portion and a drive motor, wherein the protective cover, the first air guide portions, the second air guide portion and the double-layer dust extraction cover are sequentially connected and are internally communicated, the industrial brush is disposed in the protective cover and can be driven by the drive motor, which is disposed over the protective cover, to rotate to polish a workpiece.

Wherein, a double-layer dust extraction cover comprises an outer layer, an inner layer and a gap layer defined by the outer layer and the inner layer, and has a necked end and an expanded end, and an end, away from the protective cover, of the second air guide portion is connected to the necked end of the inner layer of the double-layer air extraction cover.

Wherein, the first air guide portions are multiple air guide iron columns which are distributed at the top of the protective cover in a circumferential direction, a rotary shaft supporting hole is formed in the center of an upper surface of the protective cover, the drive motor is fixedly mounted on the upper surface of the protective cover and is connected to the industrial brush through a rotary shaft penetrating through the rotary shaft supporting hole.

The smoke and dust purification module comprises a residual collection chamber, a smoke purification chamber, an exhaust fan and a gas discharge passage, wherein the smoke purification chamber is communicated with the residual collection chamber through an air guide iron pipe, the exhaust fan is disposed below the smoke purification chamber and is used to provide a negative pressure for delivering smoke and dust into the smoke and dust purification module from the polishing and dust extraction module, and the gas discharge passage is an L-shaped passage and is used to exhaust smoke purified by the smoke purification chamber to the atmosphere.

The residue collection chamber is a cavity formed with an air inlet and an air outlet, wherein the air outlet is located close to the bottom of the cavity, and a metal filter screen, a magnetic residue box and an electromagnetic chuck are disposed in the cavity; the metal filter screen is obliquely disposed below the air inlet, a periphery of the metal filter screen is fixedly connected to a side wall of the residue collection chamber, the electromagnetic chuck is fixedly disposed at the bottom of the residual collection chamber, and the magnetic residue box is disposed on the electromagnetic chuck.

The smoke purification chamber is sequentially provided with an inlet, a physical filter layer and an outlet, wherein the outlet is formed in a position, corresponding to the exhaust fan, of the bottom of the smoke purification chamber.

One end of the air guide iron pipe is connected to the air outlet of the residue collection chamber, and the other end of the air guide iron pipe is connected to the inlet of the smoke purification chamber.

One end of the air guide hose is connected to the necked end of the outer layer of the double-layer dust extraction cover and is communicated with the gap layer of the double-layer dust extraction cover, and the other end of the air guide hose is connected to the air inlet of the residue collection chamber.

The smoke and dust treatment apparatus for welding further comprises a control chamber, wherein the control chamber is in signal connection with a mechanical arm, the exhaust fan and the drive motor and is used to control the mechanical arm, the exhaust fan and the drive motor to work.

Preferably, the industrial brush is provided with a plurality of suction guide holes.

Preferably, the double-layer dust extraction cover is provided with a plurality of suction holes, and the suction holes are spaced on the inner layer of the double-layer dust extraction cover.

Preferably, the smoke and dust treatment apparatus for welding also includes a mechanical arm, one end of the mechanical arm is detachably connected with the outer layer of the double-layer dust extraction cover, which is used to drive the double-layer dust extraction cover to move, and the other end of the mechanical arm is fixedly connected with the residue collection chamber.

Preferably, the smoke and dust treatment apparatus for welding further comprises a welding mechanism, wherein the welding mechanism comprises a welding gun head and a wire feeding mechanism connected to the welding gun head, the welding gun head movably penetrates through the double-layer dust extraction cover through a rigid sleeve, the rigid sleeve is fixedly connected to the inner layer of the double-layer dust extraction cover, a clamp is disposed on the rigid sleeve and is used to fix the welding gun head on the rigid sleeve, and the wire feeding mechanism is fixed on a mechanical arm 6 of a welding robot.

Preferably, the physical filter layer comprises a dust collecting plate layer, a HEPA filter plate layer, an activated carbon filter plate layer, a silver ion filter plate layer and a PTFE membrane covered filter material layer.

Beneficial Effects

At least, the technical solution of the invention has the following technical effects:

(1) Through the integrated design and the application of the mechanical arm, the dust treatment device integrates the three processes of grinding, welding and dust collection in the welding process into one, realizing the miniaturization, intensification and automatic control of the device.

(2) The smoke and dust treatment device of the invention adopts the design of the protective cover, and the inner side of the double-layer dust extraction cover and the industrial brush are provided with holes for air conduction, so as to enhance the effect of negative pressure dust collection. At the same time, the design of the protective cover is conducive to the spark splashing during welding and grinding, and the operation safety factor is increased.

(3) The smoke and dust purification module is equipped with a residue collection chamber and a smoke purification chamber, which can not only realize the recycling of residues, but also further purify the harmful gases in the flue gas.

DESCRIPTION OF SEVERAL VIEWS OF THE ATTACHED DRAWINGS

Figure 1:
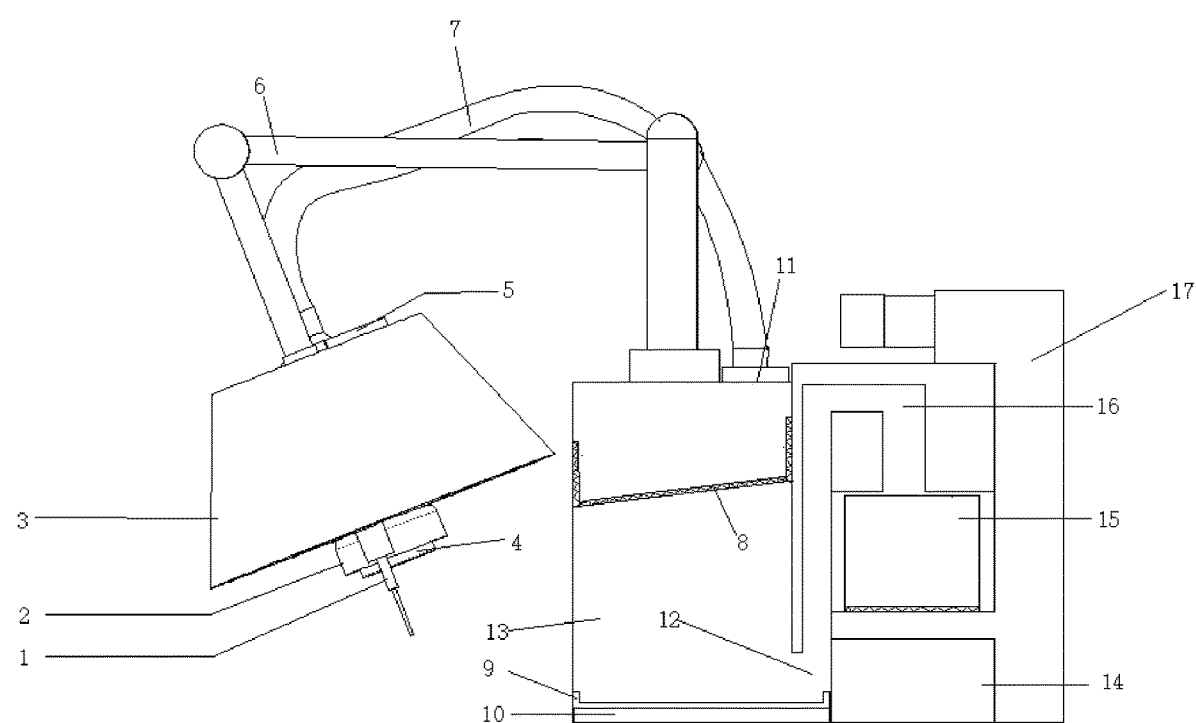
FIG. 1 is a structural diagram of an embodiment of the invention.
Figure 2:
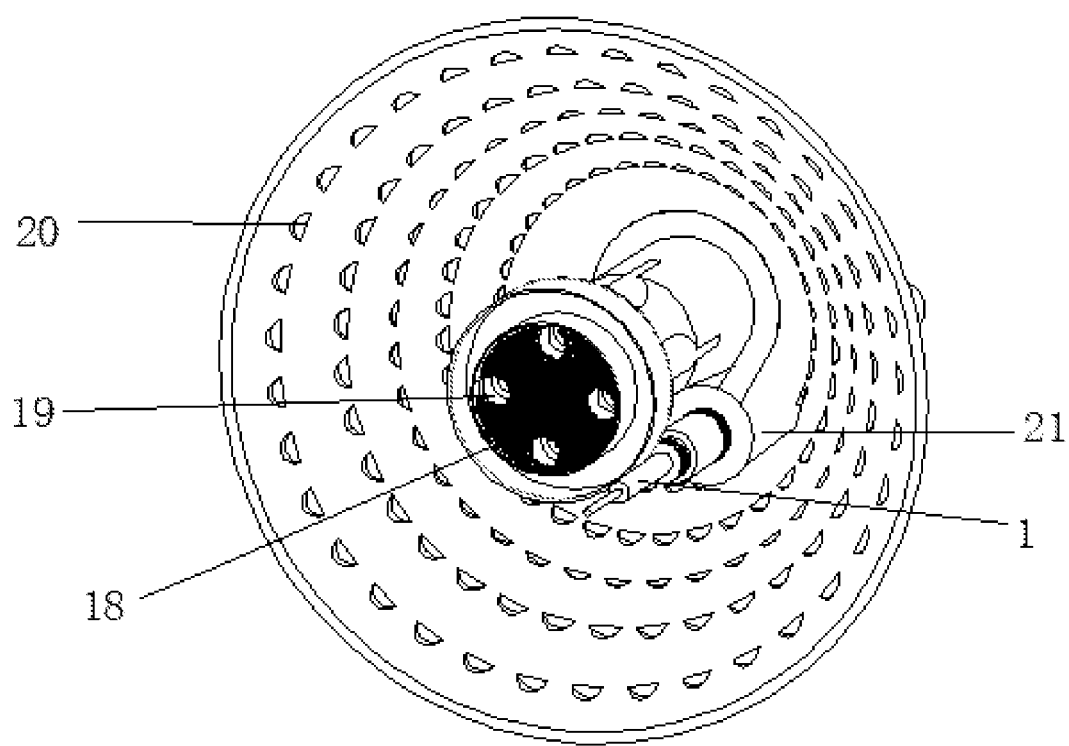
FIG. 2 is a schematic diagram of the positional relation of a double-layer dust extraction cover and an industrial brush in the embodiment of the invention.
Figure 3:
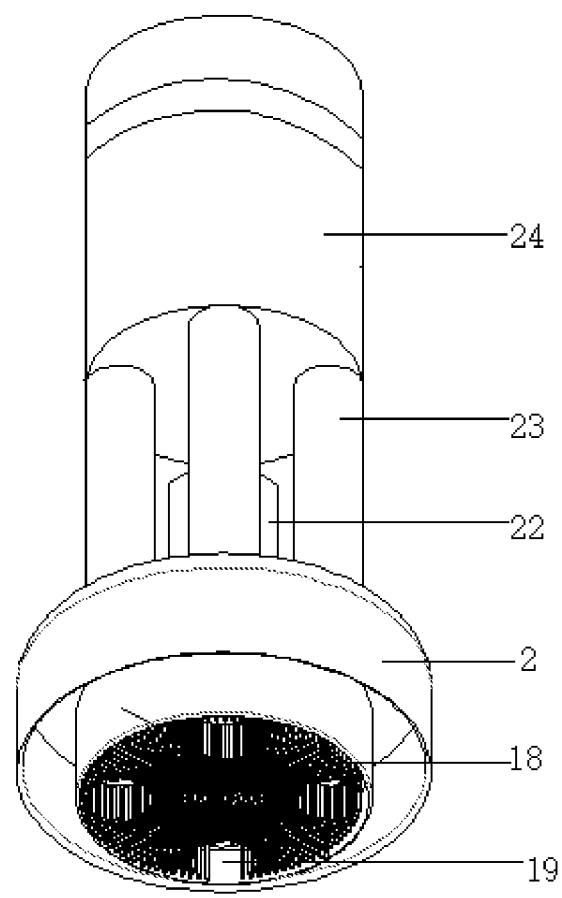
FIG. 3 is a schematic diagram of the positional relation of the industrial brush, first air guide portions and a second air guide portion in the embodiment of the invention.

REFERENCE SIGNS 1, welding gun head; 2, protective cover; 3, double-layer dust extraction cover; 4, industrial brush; 5, clamp; 6, mechanical arm; 7, air guide hose; 8, metal filter screen; 9, magnetic residual box; 10, electromagnetic chuck; 11, air inlet; 12, air outlet; 13, residue collection chamber; 14, exhaust fan; 15, smoke purification chamber; 16, air guide iron pipe; 17, gas discharge passage; 18, wire brush; 19, suction guide hole; 20, suction hole; 21, rigid sleeve; 22, drive motor; 23, air guide iron column; 24, second air guide portion.

DETAILED DESCRIPTION OF THE INVENTION

In order to make the purpose, technical scheme and advantages of the embodiment of the invention clearer, the embodiment will be described in detail in combination with the attached drawings. It should be noted that the following description only relates to the technical solution of the present invention and technologies directly related to the technical solution.

A smoke and dust treatment apparatus for welding comprises a polishing and dust extraction module and a smoke and dust purification module, wherein the smoke and dust purification module is disposed on one side of the polishing and dust extraction module and is communicated with the polishing and dust extraction module through an air guide hose 7;

The polishing and dust extraction module comprises a double-layer dust extraction cover 3, a protective cover 2, an industrial brush 4, first air guide portions, a second air guide portion 24 and a drive motor 22, wherein the protective cover 2, the first air guide portions, the second air guide portion 24 and the double-layer dust extraction cover 3 are sequentially connected and are internally communicated, the industrial brush 4 is disposed in the protective cover 2 and can be driven by the drive motor 22, which is disposed over the protective cover 2, to rotate to polish a workpiece;

Wherein, a double-layer dust extraction cover 3 comprises an outer layer, an inner layer and a gap layer defined by the outer layer and the inner layer, and has a necked end and an expanded end, and an end, away from the protective cover 2, of the second air guide portion 24 is connected to the necked end of the inner layer of the double-layer air extraction cover 3; and the double-layer dust extraction cover 3 is beneficial to internal ventilation and can more extensively extract smoke, dust and hazardous substances generated in operation.

Wherein, the first air guide portions are multiple air guide iron columns 23 which are distributed at the top of the protective cover 2 in a circumferential direction, a rotary shaft supporting hole is formed in the center of an upper surface of the protective cover 2, the drive motor 22 is fixedly mounted on the upper surface of the protective cover 2 and is connected to the industrial brush 4 through a rotary shaft penetrating through the rotary shaft supporting hole.

The smoke and dust purification module comprises a residual collection chamber 13, a smoke purification chamber 15, an exhaust fan 14 and a gas discharge passage 17, wherein the smoke purification chamber 15 is communicated with the residual collection chamber 13 through an air guide iron pipe 16, the exhaust fan 14 is disposed below the smoke purification chamber 15 and is used to provide a negative pressure for delivering smoke and dust into the smoke and dust purification module from the polishing and dust extraction module, and the gas discharge passage is an L-shaped passage and is used to exhaust smoke purified by the smoke purification chamber 15 to the atmosphere.

The residue collection chamber 13 is a cavity formed with an air inlet 11 and an air outlet 12, wherein the air outlet 12 is located close to the bottom of the cavity, and a metal filter screen 8, a magnetic residue box 9 and an electromagnetic chuck 10 are disposed in the cavity; the metal filter screen 8 is obliquely disposed below the air inlet 11, a periphery of the metal filter screen 8 is fixedly connected to a side wall of the residue collection chamber 13, the electromagnetic chuck 10 is fixedly disposed at the bottom of the residual collection chamber 13, and the magnetic residue box 9 is disposed on the electromagnetic chuck 10;

The smoke purification chamber 15 is sequentially provided with an inlet, a physical filter layer and an outlet, wherein the outlet is formed in a position, corresponding to the exhaust fan 14, of the bottom of the smoke purification chamber 15;

One end of the air guide iron pipe 16 is connected to the air outlet 12 of the residue collection chamber 13 through a rigid sleeve and a flange, and the other end of the air guide iron pipe 16 is connected to the inlet of the smoke purification chamber 15 through a rigid sleeve and a flange;

One end of the air guide hose 7 is connected to the necked end of the outer layer of the double-layer dust extraction cover 3 and is communicated with the gap layer of the double-layer dust extraction cover 3, and the other end of the air guide hose 7 is connected to the air inlet 11 of the residue collection chamber 13 through a rigid sleeve and a flange;

The smoke and dust treatment apparatus for welding further comprises a control chamber, wherein the control chamber is in signal connection with a mechanical arm 6, the exhaust fan 14 and the drive motor 22 and is used to control the mechanical arm 6, the exhaust fan 14 and the drive motor 22 to work.

Before welding, the mechanical arm 6 moves to drive a welding gun head 1 to enter the rigid sleeve 21 and to stretch out of the industrial brush 4. When the mechanical arm 6 drives the double-layer dust extraction cover 3 to move, the exhaust fan 14 is slowly started; when the mechanical arm 6 drives the double-layer dust extraction cover 3 to reach an initial welding point, the mechanical arm 6 stops moving for 1-2 seconds, at this moment, the exhaust fan 14 starts to work normally, an air flow passes through suction holes 20 in the inner side of the double-layer dust extraction cover 3 and suction guide holes 19 in the industrial brush 4, and air starts to be taken in. When welding is started, the welding gun head 1 moves to perform welding; the double-layer dust extraction cover 3 moves along with the welding gun head 1 to collect smoke and dust and to shield sparks. After welding is ended, a clamp 5 releases the welding gun head 1, which is then moves to the inner side of the double-layer dust extraction cover 3; then, the clamp 5 clamps the welding gun head 1 again; after that, the mechanical arm 6 drives the industrial brush 4 to move to the initial welding point again; the mechanical arm 6 stops moving for 1-2 seconds, the industrial brush 4 starts to rotate at a high speed, and the exhaust fan 14 starts to work, and afterwards, polishing is carried out along a welding path. After polishing, the mechanical arm 6 returns to the original position.

When the exhaust fan 14 operates at a high speed, a negative-pressure region is formed near the suction holes of the double-layer dust extraction cover 3 and the suction guide holes of the industrial brush 4, and smoke and dust generated in the welding process enter the smoke purification module through the air guide hose 7 under the effect of a negative pressure. When polishing is needed, the mechanical arm 6 drives the double-layer dust extraction cover 3 to move, the drive motor 22 drives the industrial brush 4 to rotate at a high speed, the wire brush 18 performs polishing to remove dust and rust, the exhaust fan 14 rotates at a high speed to provide a strong suction force, and residues such as iron filings generated in the polishing process are extracted via the suction guide holes 19 in the industrial brush 4.

As a preferred solution, the smoke and dust treatment apparatus for welding further comprises a welding mechanism, wherein the welding mechanism comprises a welding gun head 1 and a wire feeding mechanism connected to the welding gun head 1, the welding gun head 1 movably penetrates through the double-layer dust extraction cover 3 through a rigid sleeve 21, the rigid sleeve 21 is fixedly connected to the inner layer of the double-layer dust extraction cover 3, a clamp 5 is disposed on the rigid sleeve 21 and is used to fix the welding gun head 1 on the rigid sleeve 2, and the wire feeding mechanism is fixed on a mechanical arm 6 of a welding robot.

On the basis of the technical scheme of the invention, a person skilled in the art can carry out various improvements and deformations on the basis of the above embodiments, and these improvements and deformations fall within the protection scope of the invention.

What is claimed is:

1. A smoke and dust treatment apparatus for welding comprises a polishing and dust extraction module and a smoke and dust purification module, wherein the smoke and dust purification module is disposed on one side of the polishing and dust extraction module and is communicated with the polishing and dust extraction module through an air guide hose;

the polishing and dust extraction module comprises a double-layer dust extraction cover, a protective cover, an industrial brush, first air guide portions, a second air guide portion and a drive motor, wherein the protective cover, the first air guide portions, the second air guide portion and the double-layer dust extraction cover are sequentially connected and are internally communicated, the industrial brush is disposed in the protective cover and is driven by the drive motor, which is disposed over the protective cover, to rotate to polish a workpiece;

wherein, the double-layer dust extraction cover comprises an outer layer, an inner layer and a gap layer defined by the outer layer and the inner layer, and has a necked end and an expanded end, and an end, away from the protective cover, of the second air guide portion is connected to the necked end of the inner layer of the double-layer air extraction cover;

wherein, the first air guide portions are multiple air guide iron columns which are distributed at a top of the protective cover in a circumferential direction, a rotary shaft supporting hole is formed in a center of an upper surface of the protective cover, the drive motor is fixedly mounted on the upper surface of the protective cover and is connected to the industrial brush through a rotary shaft penetrating through the rotary shaft supporting hole;

the smoke and dust purification module comprises a residual collection chamber, a smoke purification chamber, an exhaust fan and a gas discharge passage, wherein the smoke purification chamber is communicated with the residual collection chamber through an air guide iron pipe, the exhaust fan is disposed below the smoke purification chamber and is used to provide a negative pressure for delivering smoke and dust into the smoke and dust purification module from the polishing and dust extraction module, and the gas discharge passage is an L-shaped passage and is used to exhaust smoke purified by the smoke purification chamber to the atmosphere;

the residue collection chamber is a cavity formed with an air inlet and an air outlet, wherein the air outlet is located proximate to a bottom of the cavity, and a metal filter screen, a magnetic residue box and an electromagnetic chuck are disposed in the cavity; the metal filter screen is obliquely disposed below the air inlet, a periphery of the metal filter screen is fixedly connected to a side wall of the residue collection chamber, the electromagnetic chuck is fixedly disposed at a bottom of the residual collection chamber, and the magnetic residue box is disposed on the electromagnetic chuck;

the smoke purification chamber is sequentially provided with an inlet, a physical filter layer and an outlet, wherein the outlet is formed in a position, corresponding to the exhaust fan, of the bottom of the smoke purification chamber;

one end of the air guide iron pipe is connected to the air outlet of the residue collection chamber, and the other end of the air guide iron pipe is connected to the inlet of the smoke purification chamber;

one end of the air guide hose is connected to the necked end of the outer layer of the double-layer dust extraction cover and is communicated with the gap layer of the double-layer dust extraction cover, and the other end of the air guide hose is connected to the air inlet of the residue collection chamber;

the smoke and dust treatment apparatus for welding further comprises a control chamber, wherein the control chamber is in signal connection with a mechanical arm, the exhaust fan and the drive motor and is used to control the mechanical arm, the exhaust fan and the drive motor to work;

the control chamber configured to control the exhaust fan, drive motor and mechanism arm such that before welding, the mechanical arm moves to drive a welding gun head to enter a rigid sleeve and to stretch out of the industrial brush; when the mechanical arm drives the double-layer dust extraction cover to move, the exhaust fan is started at a first speed; when the mechanical arm drives the double-layer dust extraction cover to reach an initial welding point, the mechanical arm stops moving for 1-2 seconds, at this moment, the exhaust fan operates at a second higher speed, an air flow passes through suction holes in the inner side of the double-layer dust extraction cover and suction guide holes in the industrial brush, and air starts to be taken in;

when welding started, the welding gun head moves to perform welding; the double-layer dust extraction cover moves along with the welding gun head to collect smoke and dust and to shield sparks; after welding is ended, a clamp releases the welding gun head, which is then moves to the inner side of the double-layer dust extraction cover; then, the clamp clamps the welding gun head again; after that, the mechanical arm drives the industrial brush to move to the initial welding point again; the mechanical arm stops moving for 1-2 seconds, the industrial brush starts to rotate at a first brush speed, and the exhaust fan starts to work, and afterwards, polishing is carried out along a welding path; after polishing, the mechanical arm returns to an original position;

when the exhaust fan operates at a second speed, a negative-pressure region is formed near the suction holes of the double-layer dust extraction cover and the suction guide holes of the industrial brush, and smoke and dust generated in the welding process enter the smoke purification module through the air guide hose under an effect of a negative pressure; when polishing is needed, the mechanical arm drives the double-layer dust extraction cover to move, the drive motor drives the industrial brush to rotate at the first brush speed, a wire brushes of the industrial brush performs polishing to remove dust and rust, the exhaust fan rotates at the second speed to provide a suction force, and residues such as iron filings generated in the polishing process are extracted via the suction guide holes in the industrial brush.

2. The smoke and dust treatment apparatus for welding according to claim 1, wherein the smoke and dust treatment apparatus for welding further comprises the welding mechanism, wherein the welding mechanism comprises the welding gun head and a wire feeding mechanism connected to the welding gun head, the welding gun head movably penetrates through the double-layer dust extraction cover through the rigid sleeve, the rigid sleeve is fixedly connected to the inner layer of the double-layer dust extraction cover, the clamp is disposed on the rigid sleeve and is used to fix the welding gun head on the rigid sleeve, and the wire feeding mechanism is fixed on the mechanical arm.

3. The smoke and dust treatment apparatus for welding according to claim 1, wherein the industrial brush is provided with the plurality of suction guide holes.

4. The smoke and dust treatment apparatus for welding according to claim 1, wherein the double-layer dust extraction cover is provided with the plurality of suction holes, and the suction holes are spaced on the inner layer of the double-layer dust extraction cover.

5. The smoke and dust treatment apparatus for welding according to claim 1, wherein the smoke and dust treatment apparatus for welding also includes the mechanical arm, one end of the mechanical arm is detachably connected with the outer layer of the double-layer dust extraction cover, which is used to drive the double-layer dust extraction cover to move, and the other end of the mechanical arm is fixedly connected with the residue collection chamber.

6. The smoke and dust treatment apparatus for welding according to claim 1, wherein the physical filter layer comprises a dust collecting plate layer, a HEPA filter plate layer, an activated carbon filter plate layer, a silver ion filter plate layer and a PTFE membrane covered filter material layer.

\* \* \* \* \*